July 25, 1933. H. A. FRICK ET AL 1,919,325
LIFT BODY FOR MOTOR VEHICLES
Filed Dec. 15, 1930 5 Sheets-Sheet 1

Patented July 25, 1933

1,919,325

UNITED STATES PATENT OFFICE

HARRY A. FRICK, OF CHICAGO, AND FLOYD O. ROUSE, OF DOWNERS GROVE, ILLINOIS, ASSIGNORS TO INTERNATIONAL HARVESTER COMPANY, A CORPORATION OF NEW JERSEY

LIFT BODY FOR MOTOR VEHICLES

Application filed December 15, 1930. Serial No. 502,325.

The invention relates to motor vehicles, and especially to lift and tilting bodies or platforms for use with such vehicles.

In the use of motor trucks in connection with the shipment of freight packages and containers between loading platforms at loading and unloading stations, it is a great advantage to have a lift platform or body on the track, which can be power raised or lowered, to conform with the varying heights of loading platforms encountered at different loading and unloading stations, to facilitate ease of transfer of the containers from the loading platform to the truck platform, and vice versa.

To accomplish this result, the lift body or platform on the motor truck should be capable of being raised or lowered in a horizontal plane. Sometimes, when the truck is backed endwise against the loading platform, it is desirable that the freight container or the like loaded onto the truck be shifted to the front end of the truck body or platform, and consequently it is desirable that the truck platform be tiltable, so as to form an inclined plane, causing the container to slide to the forward end of the truck platform. This is desirable when loading the truck. Conversely, when unloading the truck, it is desirable that the rear end of the truck function as the bottom end of an inclined plane by tilting the front end of the lift body or platform upwardly, causing the container on the platform to be slid rearwardly.

It is desirable that such up and down tilting of the platform can be effected from any intermediate raised position of the platform, by which is meant that the platform should be capable of a rising movement in a horizontal plane to an intermediate position, to conform with the height of a loading platform, and, then, from this intermediate position, the platform should be capable of either a fore or aft tilting movement.

Further, it is highly desirable that the mechanism for so operating the truck platform be power actuated and arranged as compactly as possible, so that, especially when the platform is in its lowered position, the mechanism will not extend downwardly far enough below the truck chassis to become an obstruction which would strike obstacles in the road traveled. Automatic throw-out means should also be provided to make the power driving means inactive when the platform or either end thereof reaches its upper and lower limits of travel.

With this statement of what is desirable, it is the main object of this invention to provide for a motor vehicle, such as a truck, an improved lift platform or body which may be power actuated to cause the same to rise vertically in a horizontal plane, or to rise in such manner to an intermediate horizontal plane, whereby the power mechanism may be controlled to cause tilting of either end of the platform upwardly.

It is also an object of this invention to provide an improved throw-out mechanism which acts automatically to stop the driven mechanism when the platform or either end thereof reaches a predetermined maximum up or down position.

Still another object is to provide an improved gear mechanism driven from the power take-off of the motor truck, which gear mechanism actuates the platform and is decidedly compact, whereby it will not be subjected to damage by road obstacles. The elevating mechanism for the platform per se involves a special form of rack lift member, which folds in the lowered position of the platform flatly and horizontally alongside the frame channels of the truck body.

Still another object is to provide such mechanism which will be commercially practicable and capable of association with any standard motor truck chassis as an attachment therefor.

Other objects will become apparent to those skilled in this art as the disclosure is more fully made.

In the illustrative example of the invention herein chosen by way of example, the invention is included with a standard motor truck chassis, said invention comprising a horizontal platform or body mounted on a special form of lift racks which are power actuated to cause the platform to be raised or lowered in a horizontal plane, said racks being four in number, two in front and two in back, so that the front set or the rear set can be actuated independently, whereby to cause tilting of either end of the platform from said horizontal plane. Control means is also provided to make the driving connections inactive when the platform has been moved or either end has been moved to a predetermined maximum up or down position. These lifting and lowering power actuated racks are developed along a special curvature, so that, when the platform is in its lowermost position, the same will neatly and compactly fold alongside the frame channels of the truck body, so as not to form any depending obstruction that might encounter road obstacles and in this manner damage to the rack mechanism will be effectively prevented. So much will suffice for the present in giving a general survey of the invention.

Reference should now be made to the accompanying sheets of drawings illustrating one form which this invention may assume in practice.

In these drawings,—

Figures 1, 4, 5:
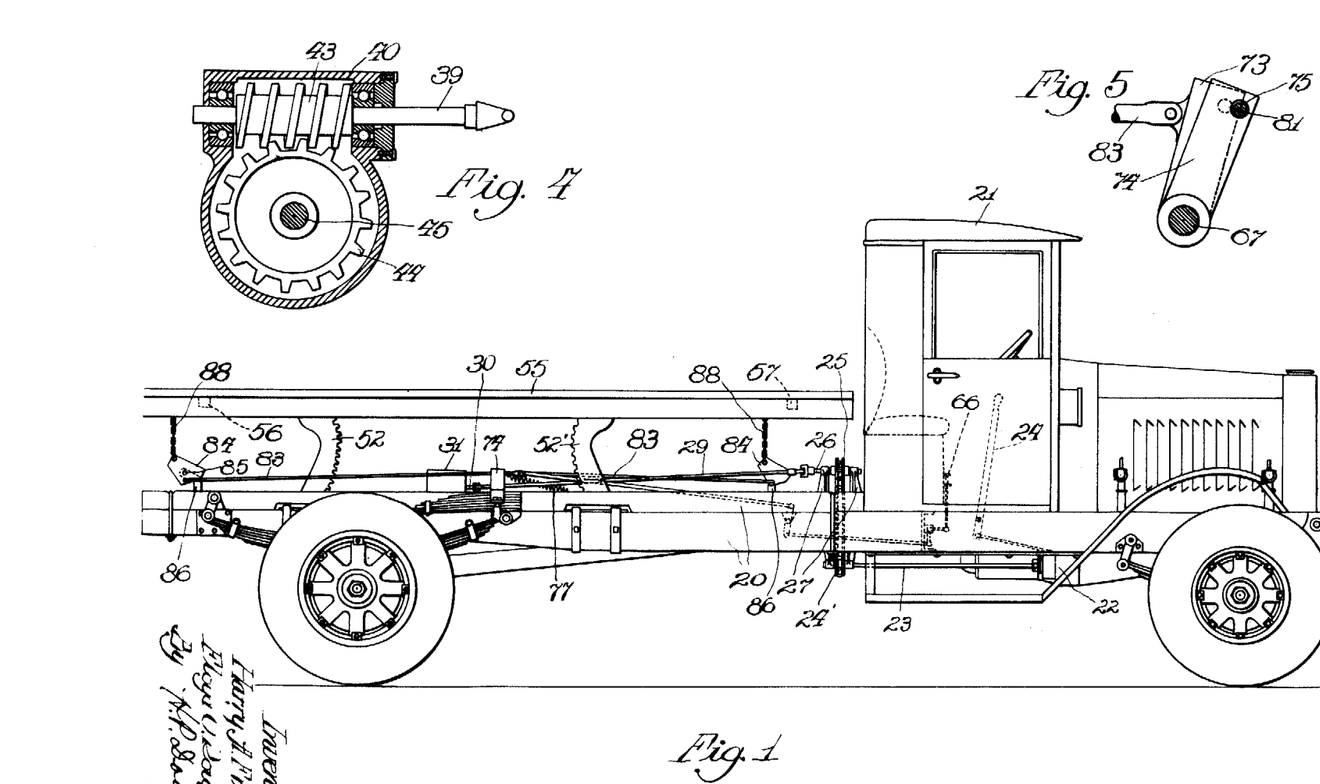
Figure 1 is a general side, elevational view of a motor truck with the improved lift platform shown associated therewith and in a position raised in a horizontal plane.
Figure 4 is a vertical sectional view taken along the line 4—4 appearing in Figure 3.
Figure 5 is a detail, side elevational view of a part of the automatic throw-out mechanism, as seen along the section line 5—5 appearing in Figure 8.
Figures 2, 12:
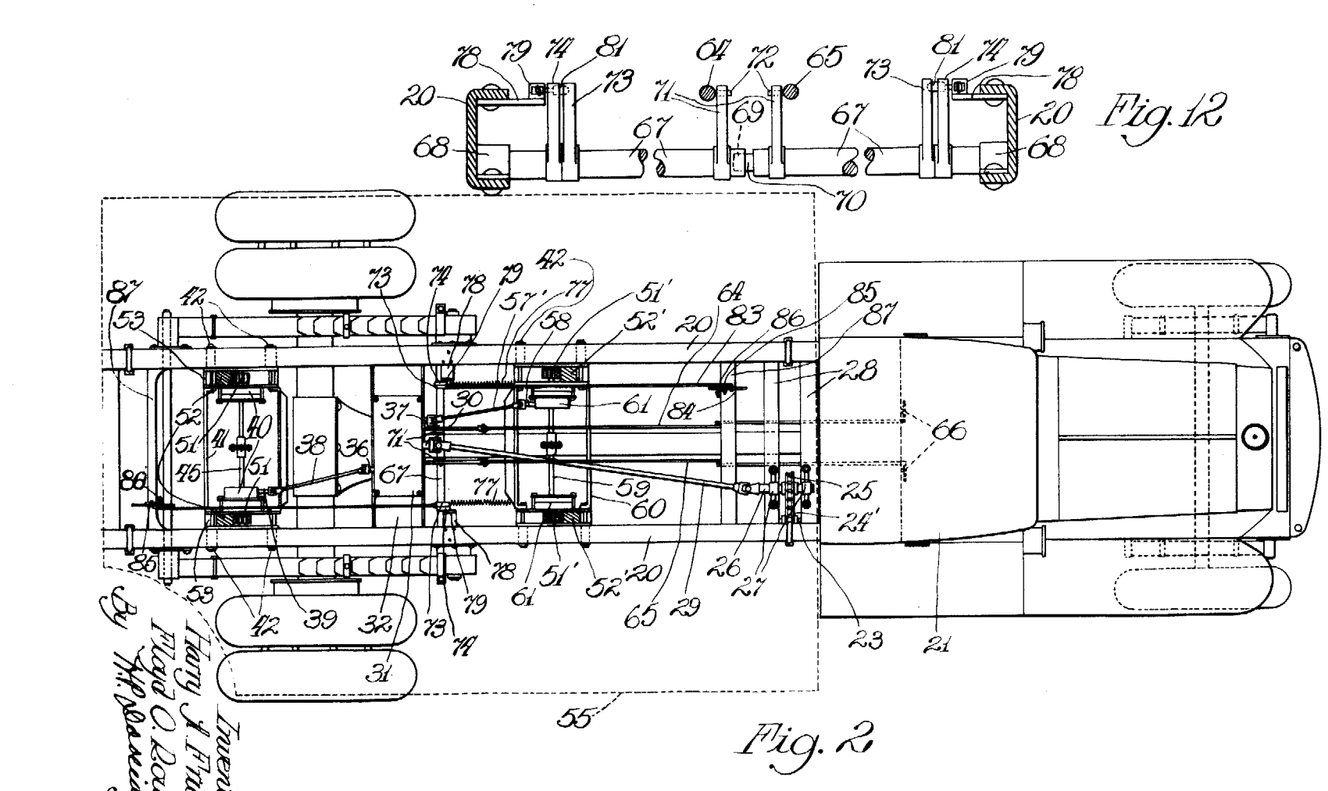
Figure 2 is a general plan view of the truck with the lift platform appearing in dotted lines to show the operating mechanism therebeneath.
Figure 12 is a transverse cross sectional view through the truck chassis, as seen along the line 12—12 appearing in Figure 6, to illustrate the throw-out mechanism.

Referring to Figures 1 and 2, it will be seen that a standard motor truck has been shown, which truck has the usual side channel frame members 20 carrying a driver's cab 21. The motor truck includes a standard transmission 22 from which protrudes rearwardly a longitudinally disposed power take-off shaft 23, which, in the usual manner, may be controlled by a lever 24 within the cab 21, because said shaft 23 can be driven either clockwise or counterclockwise. The power take-off shaft 23, as best shown in Figures 1 and 2, drives at its rear end a vertically disposed run of sprocket chain 24', which drives a sprocket wheel 25 carried on a shaft 26 suitably journaled in brackets 27 carried by cross sills 28 fastened to the side frame members 20 of the motor truck. This shaft 26 is appropriately connected to drive a rearwardly extending propeller shaft 29.

Figure 3:
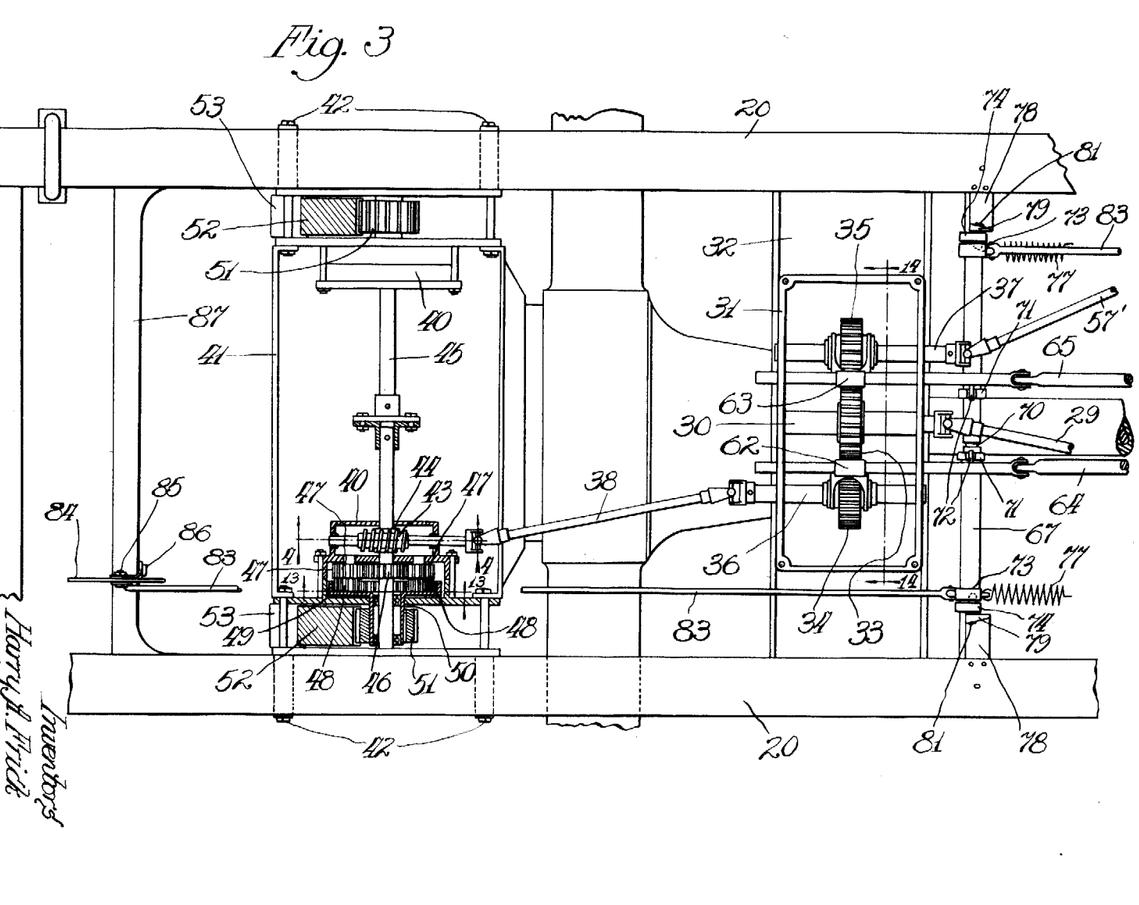
Figure 3 is another general plan view on a somewhat enlarged scale, to show the driving mechanism which actuates the racks.
Figure 6:
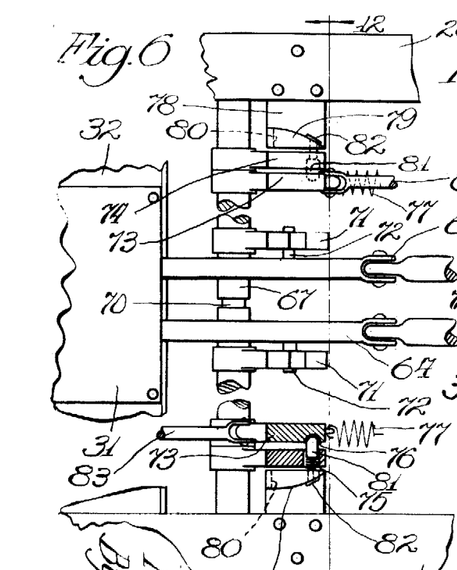
Figures 6, 7 and 8 are, respectively, plan views on an enlarged scale to illustrate different positions assumed by the automatic throw-out mechanism.
Figure 7:
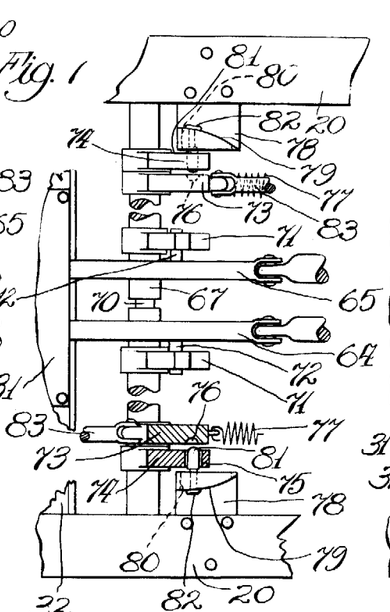
Figure 8:
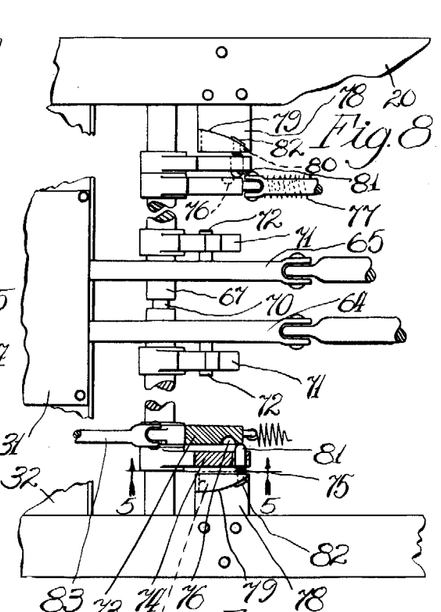
Figure 14:
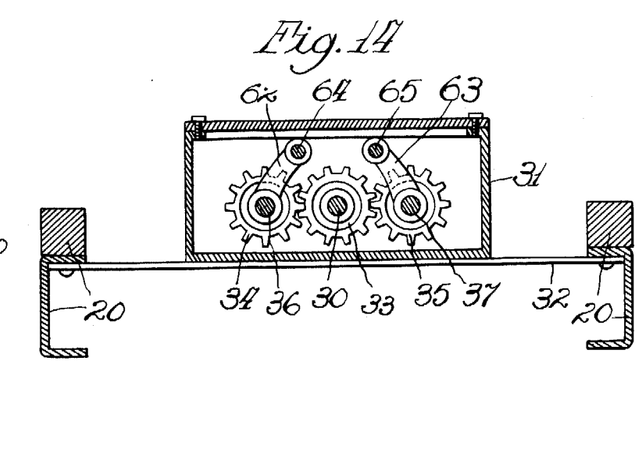
Figure 14 is a cross sectional view, as seen along the line 14—14 appearing in Figure 3.

As shown in Figure 3, this propeller shaft drives a shaft 30 (see also Figure 14) arranged along the longitudinal median line of the truck chassis and journaled in a case 31 appropriately carried on a cross plate 32 mounted on the frame members 20. This shaft 30 carries fast thereon, a spur gear 33, which meshes with slidable offset gears 34 and 35, respectively, carried on shafts 36 and 37, also journaled in the case 31. The shaft 36 is connected to drive a propeller shaft 38 extending obliquely to the rear, as shown in Figure 3, and is appropriately connected in turn to drive a short, longitudinal stub shaft 39 carried in a case 40, which case 40 is bolted to a housing 41 appropriately secured by bolts 42 to the rear ends of the frame members 20. As shown in Figure 4, the shaft 39 carries within the case 40 a worm gear 43 in mesh with a worm wheel 44 made fast to a cross shaft 45 journaled in the housing 41 (see Figures 3 and 4).

Figure 13:
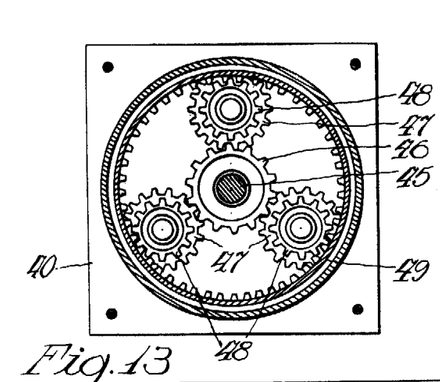
Figure 13 is a cross sectional view through a set of the planetary gearing, as seen along the line 13—13 appearing in Figure 3.

The shaft 45 extends across the housing 41, as shown in Figure 3, and at each end it carries a spur gear 46 constituting the sun gear of planetary gear sets. In each set the gear 46 drives planetary pinions 47, (see Figure 13), each of which is integral with pinion 48 in mesh with an internal ring gear 49, which has a laterally extending hub 50, to which is splined a pinion or spur gear 51, the gears 51 being arranged, as shown in Figure 3, laterally outside the ends of the housing 41.

Figure 15:
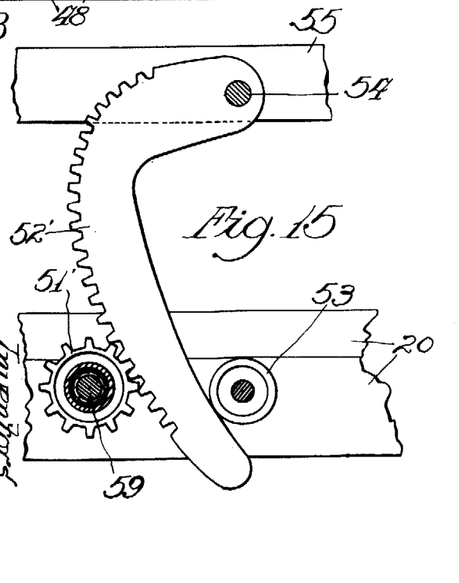
Figure 15 is a side elevational, detail view showing the special form of rack in its elevated position; and, Figure 16 is a similar view, showing the rack in its folded position with the platform lowered.
Figure 16:
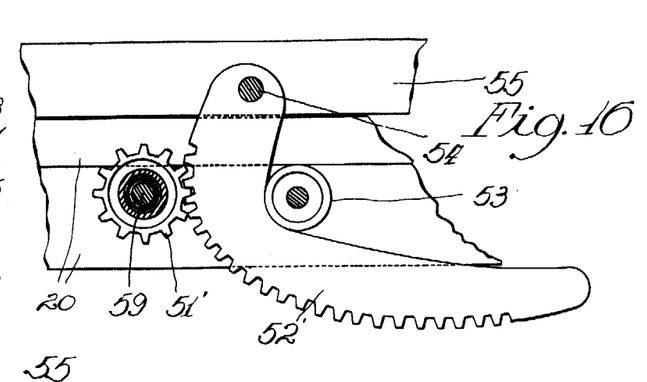

As best shown in Figures 15 and 16, the gears 51 are in mesh with a gear rack 52, of which there are two at the rear end of the motor truck chassis. The gear face of each of these racks 52 is generated along a curve, which substantially approximates an involute. The back side of each rack is guided by a roller 53 carried on frame 20, said roller functioning to guide the rack 52 and hold the same in mesh with the pinion 51. The upper part of each rack carries a pin 54 for pivotally connecting said racks to a truck body comprising a horizontal platform 55 carrying at its front and rear, cross abutments 56 and 57 indicated in Figure 1.

Going back now to Figure 3, it will be seen that the shaft 37 in a similar manner drives an oblique and forwardly extending propeller shaft 57' that is connected to drive a longitudinal stub shaft 58, to drive in the same manner a front cross shaft 59 journaled in a housing 60 secured to the forward portion of the chassis or frames 20. This shaft 59 drives a pair of planetary gear sets 61 constructed like the planetary gear sets at the rear of the truck frame already described. These front planetary gear sets 61 in the same fashion drive pinions 51', whereby, in the manner already made known, to drive the same kind of involute racks 52', said racks at their upper ends being pivotally connected at two forward points beneath and to the body or platform 55.

Obviously, now, with the parts shown as in Figure 3, with the gears 34 and 35 in mesh with the drive gear 33, if the power take-off shaft 23 is in operation, then the front and rear planetary gear sets will be driven, causing the pinions 51, 51' to raise the racks 52, 52' alike and at the same speed, to elevate the platform 55 in a horizontal plane. The planetary gear sets serve the purpose of reducing speed, so that the raising operation will be slowed down the desired amount.

As has been stated, the gears 34 and 35 are keyed to their shafts 36 and 37, respectively, for sliding movement, whereby either gear 34 or 35 can be thrown out of engagement with the gear 33, which makes it possible to drive the rear planetary gear sets alone, or the front planetary gear sets alone. This makes it possible, for example, to hold the front end of the platform stationary while raising or lowering the rear end of the platform by power, to tilt the platform fore or aft, as may be desired. The shifting of the gears 34 and 35 is controlled by shifter forks 62 and 63, respectively, through rods 64 and 65 connected to a pair of hand controls 66 in the cab 21 of the truck.

When the platform 55 is raised or lowered horizontally or either end is tilted up or down, it is desirable, for the purpose of preventing damage to the racks and gearing which drives the same, to provide automatic throw-out means, which will disconnect said racks and gearing from the power take-off, whereby to stop the drive when the platform or either end thereof reaches maximum up or down positions. Such mechanism is accordingly provided and will now be described.

Figure 9:
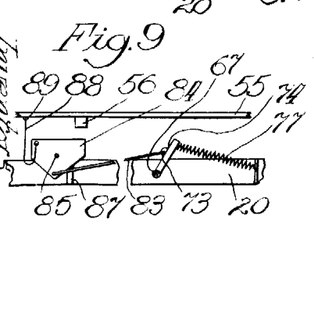
Figures 9, 10 and 11 are side views corresponding with the showings, respectively, in Figures 6, 7 and 8.
Figure 10:
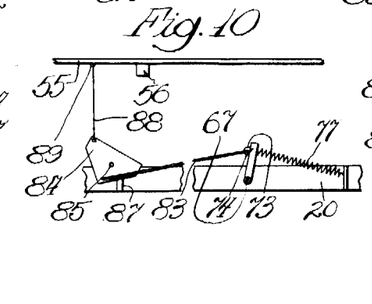
Figure 11:
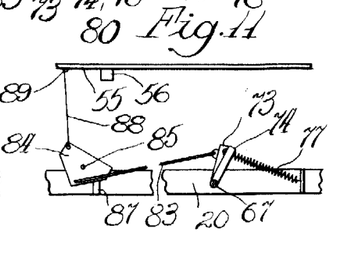

Looking to Figures 3, 4, and 6 to 11, inclusive, it will be seen that the frame members 20 carry a two-part shaft 67 (see Figure 12), by means of bearings 68, which carry said two-part shaft for rocking movement. The shaft 67 is split in the middle, one inner end being formed with a socket 69, and the other inner adjacent end of the shaft being formed with a stud 70 loosely and turnably fitted thereinto, so that the two shaft parts can turn or rock independently of each other, or together, as will later appear. The inner ends of these shaft parts carry arms 71, which are made fast to the shaft parts, while the upper ends of these arms are connected by means 72 to the push and pull rods 64 and 65, respectively. Each part of the shaft 67 also carries towards its outer end, a loosely mounted arm 73 and a fast mounted arm 74, the arms 74 adjacent their upper ends each being formed with a through opening 75, and the adjoining face of the arms 73 being formed with an aligned or registering depression 76. The loose arms 73 are each spring pulled by a spring 77. Each side frame member 20 carries a plate 78 formed with a cam surface 79 and a slot 80, said member 78 carrying a spring pressed detent 81 passed through the hole 75 and having a head 82 engaging the cam surface 79. Further, these loose arms 73 are respectively connected by links 83 to front and rear three-cornered control blocks 84 suitably pivoted by pins 85 to a bracket 86 carried by a cross sill 87 supported on the frames 20. As best shown in Figures 9, 10 and 11, the rods 83 are each connected to a lower corner of the blocks 84. The upper, rear corner of each of these blocks is connected by a flexible element, such as the chain 88, at 89 to the under side of the platform 55, while the upper forward corner of each of these blocks 84 is adapted to be contacted by the abutment members 56 heretofore described.

In operation, it will be assumed that the motor truck is ready for use with the body or platform 55 in its lowermost position resting substantially on the frame sills 20, the racks 52 being in their folded position, as shown in Figure 16, with the major portion of the racks, due to their curvature, lying in substantially a horizontal plane adjacent the frames 20, well above the ground where they cannot interfere with the passage of the truck over road obstacles. The drive from the power take-off shaft 23 is inactive when the gears 34 and 35 have been thrown out by the two hand levers 66, as the gear 33 will then merely be idling and not driving the propeller shafting 38 and 57 which operates the planetary gear sets. We will assume that the truck has been backed against a loading platform and that the loading platform is higher than the lowered position of the platform 55 of the truck. It, therefore, becomes necessary in conveniently transferring a load from the loading platform to the body platform of the truck to elevate said platform 55 horizontally until it approaches a level coinciding with the height of the loading platform. Thereupon the operator in his cab 21 actuates the lever 24 to make the power take-off shaft 23 operative, or, if the power take-off is running continuously, he actuates the two levers 66 to throw the gears 34 and 35 into mesh with the driving pinion 33. As a result, the propeller shafts 38 to the rear and 57 to the front are driven, which causes the rear set and front set of planetary gear mechanisms to drive the rear pinions 51 and front pinions 51'. As a result, the gear racks 52 are moved upwardly, thereby elevating the platform 55, and, as the racks 52 and 52' in this instance are all moving alike, the platform 55 must be maintained horizontal in parallelism with the frames 20 as it rises. At any instant, the operator in his cab 21 can, by means of the levers 66, disengage the gears 34 and 35 to stop the drive and thereby hold the platform 55 in the desired elevated position which will coincide with the height of the loading platform.

If it is required to elevate the platform 55 to its maximum raised position, then reference should be made to Figure 9, wherein is illustrated the fact that the abutments 56, which had been holding one corner of the three-cornered block down, leaves, or rises away from said blocks 84, whereupon the springs 77 are operative to pull the loose levers 73 forwardly. The platform continues to rise gradually tautening the chain 88, and, when the platform reaches its maximum movement, as shown in Figure 1, the three-cornered blocks 84 are tilted upwardly at their rear ends, as shown in Figure 10, whereupon the links 83 are operative to pull the loose levers 73 rearwardly against the pull of the springs 77. With the initiation of this movement, as appears in Figures 6 and 9, the loose levers 73 are coupled to the fast levers 74 by the spring pressed detent 81, so that the levers 73 and 74 both move upwardly together. This rocks the two shaft parts 67 as a unit rearwardly, and, as the arms 71 are fast with the shaft parts 67, they too will rock to the rear. Further, as these fast arms 71 are connected to the push and pull rods 64 and 65, respectively, said push and pull rods will be moved longitudinally to the rear, thereby disengaging, through the shippers 62, 63, the gears 34 and 35 out of mesh with the gear 33, thereby stopping the drive and preventing damage to the gear connections. As the arms 73 and 74 go up together during this rising movement of the platform, the cam surfaces 79 are operative in an obvious manner to withdraw the spring pressed detents 81 from the depression in the loose arms 73, thereby freeing the loose arms 73 from the arms 74. Immediately thereupon, the springs 77 are operative to return the loose arms 73 a slight distance forwardly to bring said arms to their normal positions. Now, when the operator desires to lower the platform, he must, by means of the hand levers 66, shift the gears 34 and 35 back into mesh with the gear 33, after first having used the lever 24 to reverse the power take-off drive in any conventional manner. Thereupon the power connections are set to drive the racks 52 downwardly. When the operator, as just described, has shifted the gears 34 and 35 back into mesh with the gear 33, he has also rocked the shaft 67 forwardly with the fast arms 74, so that the parts assume the position shown in Figure 8 with the detent 81 disposed in a position slightly in advance and out of registration with the depression 76. This position of the parts is also illustrated in Figures 5 and 11. When the platform approaches its maximum down position, the abutments 56 strike the upper right-hand corner of the three-cornered blocks 84, which causes the links 83 to pull the levers 73 to the rear against the pull of the springs 77, thereby once more actuating the push-pull rods 64, 65 to pull the gears 34, 35 out of mesh from the gear 33.

For tilting the platform 55 fore and aft, either the rear set of racks 52 or the front set of racks 52' can be power operated independently of the other, by which is meant that one can be held stationary and the other set can be driven. Let us assume that the platform 55 is carrying a load and that the truck has been backed up against an unloading platform, and, to facilitate transfer of the load from the truck platform, it is highly advantageous to tilt the front end of the platform 55 up, so that the load can slide down the inclined plane thus produced onto the loading platform without the imposition of manual effort. Accordingly, the operator will actuate one of his levers 66 to shift the gear 34 out of mesh with the gear 33 and, as a result, the rear set of planetary gears and the rear racks 52 will not be driven, as only the gear 35 now remains in mesh with the gear 33. Thereupon, power goes through the propeller shaft 57 to the front shaft 59 to drive the two front planetary gear sets, which actuate the two front involute racks 52'. Thereupon, the forward end of the platform 55 is raised and, when it reaches its maximum lift position, a flexible element 88 rocks the front block 84 in the manner described to actuate the front link 83, whereupon only one set of the levers 73 and 74 is operative to rock one side of the shaft 67 and the push-pull rod 65 to throw the gear 35 out of mesh with the gear 33 in the manner described.

It will be understood that the automatic throw-out mechanism is actuated only by maximum up or down movements of both ends of the platform 55 together or when one end of the platform 55 only reaches a maximum position. However, the platform 55 obviously can be raised up horizontally to any position intermediately of the maximum and minimum and from such intermediate horizontal position, either the forward end of the platform or the rearward end of the platform 55 may be tilted any amount within the range of movement permitted. If it is desired to throw out the drive during such tilting movements at any time before the maximum is reached, which would actuate the automatic throw-out, then obviously the operator still can use one of his two levers 66 to shift the appropriate gear 34 or 35 and stop the drive wherever he desires.

From this detailed description it must now be apparent that a lift platform for motor vehicles has been provided which, within its range of movement, provides remarkable facilities for setting or tilting the platform in most any position desired. Obviously the invention described also will achieve all of the desirable objects heretofore recited.

It is the intention to cover herein all such changes and modifications in the preferred embodiment herein disclosed which do not depart from the spirit and scope of this invention as is expressed in the following claims.

What is claimed is:

1. The combination with a vehicle having a frame and a power take-off, of a platform normally carried horizontally above the frame, racks connected to and adjacent the platform ends, said racks disposed in front and rear pairs, planetary gear sets arranged in front and rear sets to drive the racks for elevating the platform relative to the frame, and means connecting said planetary gear sets to be driven from the power take-off simultaneously or each set independently of the other.

2. The combination with a vehicle having a frame and a power take-off, of a platform normally carried horizontally above the frame, racks connected to and adjacent the platform ends, said racks disposed in front and rear pairs, planetary gear sets arranged in front and rear sets to drive the racks for elevating the platform relative to the frame, means connecting said planetary gear sets to be driven simultaneously or independently of each other from the power take-off to raise the platform horizontally or to tilt either end thereof, and means to disconnect the racks and gear sets from the power take-off when an end of the platform reaches a predetermined maximum position in its movement.

3. In a vehicle, a frame, a platform, a source of power on the frame, a first gear case on the frame carrying a central gear and two offset gears in mesh with the central gear, means for driving the central gear from said source of power, a front gear case in advance of the first case, a rear gear case rearwardly of the first case, a cross shaft in each of said front and rear cases, a reduction gear set at the end of each shaft whereby to provide a front pair and a rear pair of gear sets, a rack driven from each gear set, each rack being connected to the platform whereby to move the platform, driving connections between one offset gear and the front cross shaft to drive the front gear sets and front racks, and driving connections between the other offset gear and the rear cross shaft to drive the rear gear sets and rear racks.

4. In a vehicle, a frame, a platform, a source of power on the frame, a first gear case on the frame carrying a central gear and two offset gears adapted to mesh with the central gear, means for driving the central gear from said source of power, a front gear case in advance of the first case, a rear gear case rearwardly of the first gear case, a cross shaft in each of said front and rear cases, a planetary gear set at the end of each shaft whereby to provide a front pair and a rear pair of planetary gear sets, a rack driven from each planet set, each rack being connected to the platform whereby to move the platform, driving connections between one offset gear and the front cross shaft to drive the front planetary gear sets and front racks, and driving connections between the other offset gear and the rear cross shaft to drive the rear planetary gear sets and rear racks.

5. In a vehicle, a frame, a platform, a source of power on the frame, a first gear case on the frame carrying a central gear and two offset gears adapted to mesh with the central gear, means for driving the central gear from said source of power, a front gear case in advance of the first case, a rear gear case rearwardly of the first gear case, a cross shaft in each of said front and rear cases, a planetary gear set at the end of each shaft whereby to provide a front pair and a rear pair of planetary gear sets, a rack driven from each planet set, each rack being pivotally connected to the platform whereby to move the platform, driving connections between one offset gear and the front cross shaft to drive the front planetary gear sets and front racks, driving connections between the other offset gear and the rear cross shaft to drive the rear planetary gear sets and rear racks, and means for shifting either or both of said offset gears out of mesh with said central gear.

6. In a vehicle, a frame, a platform, a source of power on the frame, a first gear case on the frame carrying a central fixed gear and two offset shiftable gears adapted to mesh with the central gear, means for driving the central gear from said source of power, a front gear case in advance of the first case, a rear gear case rearwardly of the first gear case, a cross shaft in each of said front and rear cases, a planetary gear set at the end of each shaft whereby to provide a front pair and a rear pair of planetary gear sets, a rack driven from each planet set, each rack being connected to the platform whereby to move the platform, driving connections between one offset gear and the front cross shaft to drive the front planetary gear sets and front racks, driving connections between the other offset gear and the rear cross shaft to drive the rear planetary gear sets and rear racks, and automatically acting means for shifting either or both of said offset gears out of mesh with the central gear, said means being controlled by the platform when its ends reach, or either end thereof reaches, a predetermined maximum position.

7. In a vehicle, a frame, a platform, a source of power on the frame, a first gear case on the frame carrying a central gear and two offset gears in mesh with the central gear, means for driving the central gear from said source of power, a front gear case in advance of the first case, a rear gear case rearwardly of the first gear case, a cross shaft in each of said front and rear cases, a planetary gear set at the end of each shaft whereby to provide a front pair and a rear pair of planetary gear sets, a substantially involute rack driven from each planet set, each rack being pivotally connected to the platform whereby to move the platform, driving connections between one offset gear and the front cross shaft to drive the front planetary gear sets and front racks, driving connections between the other offset gear and the rear cross shaft to drive the rear planetary gear sets and rear racks, and means by which either set of racks may be operated independently of the other to tilt the platform.

HARRY A. FRICK.
FLOYD O. ROUSE.